United States Patent [19]
Ruck et al.

[11] Patent Number: 5,623,766
[45] Date of Patent: Apr. 29, 1997

[54] PROBE HEAD FOR COORDINATE MEASURING APPARATUS WITH DAMPING AND CLAMPING FEATURES

[75] Inventors: Otto Ruck, Ellwangen-Pfahlheim; Franz Szenger, Königsbronn, both of Germany

[73] Assignee: Carl-Zeiss-Stiftung, Heidenheim, Germany

[21] Appl. No.: 498,344

[22] Filed: Jul. 5, 1995

[30] Foreign Application Priority Data

Jul. 9, 1994 [DE] Germany ............... 44 24 225.5

[51] Int. Cl.⁶ ........................................ G01B 5/004
[52] U.S. Cl. ................................. 33/561; 33/559
[58] Field of Search ................. 33/1 M, 556, 558, 33/559, 560, 561

[56] References Cited

U.S. PATENT DOCUMENTS

| | | |
|---|---|---|
| 3,869,799 | 3/1975 | Neuer et al. |
| 3,945,124 | 3/1976 | Jacoby et al. ............... 33/561 |
| 5,041,806 | 8/1991 | Enderle et al. ............... 33/561 |
| 5,259,122 | 11/1993 | Ichiba et al. ............... 33/561 |
| 5,535,524 | 7/1996 | Carrier et al. ............... 33/1 M |

FOREIGN PATENT DOCUMENTS

| | | |
|---|---|---|
| 3210711 | 2/1984 | Germany. |
| 4001981 | 7/1990 | Germany. |

*Primary Examiner*—G. Bradley Bennett
*Attorney, Agent, or Firm*—Walter Ottesen

[57] ABSTRACT

The invention is directed to a probe head of the measuring type equipped with measuring force generators (15 to 17) for the generation of measuring forces of pregiven magnitude and direction. The probe head further includes a system for arresting or clamping the displaceable part 10 of the probe head in preselectable directions. The measuring force generators are arranged directly on the displaceable parts (4, 9, 10) of the guide units for the different deflection directions (x, y, z). The arresting or clamping system is implemented in the form of an electronic control circuit which applies a signal to the force generators (15 to 17) which is opposite to the deflection of the displaceable part 10. In addition, the probe head includes a system for damping the displaceable part. This damping system operates also on an electromagnetic basis with the aid of the measuring force generators configured as plunger coils.

10 Claims, 5 Drawing Sheets

PROBE HEAD FOR COORDINATE MEASURING APPARATUS WITH DAMPING AND CLAMPING FEATURES

FIELD OF THE INVENTION

The invention relates to a probe head for coordinate measuring machines (CMM) equipped with systems for measuring the deflection of the flexible probe head part and with electromagnetic force generators for generating measuring forces of pregiven magnitude and direction.

BACKGROUND OF THE INVENTION

Such a probe head is described, for example, in U.S. Pat. No. 3,869,799. It belongs to the category of so-called "measuring" probe heads, which emit a signal proportional to the deflection of the probe carrier, as opposed to so-called "switching" probe heads, which only generate a pulse-shaped signal at the instant of contact with the workpiece.

The measuring force generators of the known probe head are plunger coil systems mounted in the upper part of the probe head so that the waste heat generated during operation is kept away as much as possible from the guide units configured in the manner of a spring parallelogram, from which the flexible probe carrier is suspended. A rod assembly is used for the transmission of forces applied by the plunger coils to the spring parallelograms assigned to the individual coordinate directions; this makes the force transmission indirect and "soft". The spring parallelograms can also be fixed in the individual coordinate directions by means of mechanical catches which arrest the deflections of the spring parallelograms in their electrical or mechanical zero points.

In this probe head, it is difficult to systematically set the measuring forces and the fixation in other than the directions mechanically defined by the spring parallelograms.

In German Patent 3,210,711, another probe head of the "measuring" type is described. In this probe head, the measuring force generators are located directly on the guide units for the different deflection directions also implemented in the form of spring parallelograms. An electronic system is associated with the probe head via which the direction of the force vector can be set at will according to pregiven desired values. In addition, passive damping elements are assigned to the individual guide unit directions, which prevent uncontrolled oscillation of the flexible probe about its zero position. However, this known probe head does not permit the flexible probe carrier to be clamped in individual coordinate directions.

From U.S. application Ser. No. 08/035,716, filed Mar. 23, 1993, now U.S. Pat. No. 5,471,406, a probe head is known which can be clamped electronically by applying strong restoring forces to the drives in the probe head upon probe deflection. The configuration of the probe head is not described in detail.

From German published patent application 4,001,981, it is known to dampen the vibrations of the horizontal arm of a stationary coordinate measuring apparatus by adding mass at the side of the probe head, either by using a viscous liquid in which the additional mass moves, or actively with the help of a drive for the additional mass and a control device which activates the drive in dependence upon signals of a vibration sensor. This, however, is only sufficient to keep the probe head at rest, but does not dampen the relative movement between the flexibly mounted probe and the part of the probe head which is permanently connected to the housing.

In addition, the previously mentioned probe heads all have a relatively complicated and hence expensive mechanical configuration, partly because separate, additional assemblies are used for clamping and damping. These assemblies are not very flexible with respect to the setting of clamping forces and damping characteristics and cannot easily be adapted to varying operating conditions or measuring tasks.

SUMMARY OF THE INVENTION

It is the object of the invention to provide a probe head of the measuring type which contains both a system for clamping as well as for damping the movement of the flexible probe carrier. It is a further object of the invention to provide a simple configuration variable in application.

The probe head of the invention is for a coordinate measuring apparatus and includes: a displaceable part; three measuring systems for measuring the deflections of the displaceable part in three different directions; a guide system for holding the displaceable part so as to permit the displaceable part to deflect in said different directions; the guide system including: a first guide unit for permitting the part to deflect in a first one of the directions; a second guide unit for permitting the part to deflect in a second one of the directions; and, a third guide unit for permitting the part to deflect in a third one of the directions; each one of the guide units including a measuring sensor for measuring the deflection in the one direction corresponding thereto; each one of the guide units further including: an electromagnetic force generator for generating a measuring force of predeterminable magnitude and direction; a clamping device for clamping the displaceable part in the predeterminable direction; the clamping device including a control circuit for applying a signal to the electromagnetic force generators opposite in direction to the deflection of the displaceable part; and, an electromagnetic damping device for the displaceable part.

In the probe head according to the invention, the force generators, the clamping system and the damping system, that is, all three function assemblies operate electromagnetically. For this reason, it is possible to combine all these functions in the force generators, or rather, in the electronic system used to control them. It is possible, for example, to configure the damping system according to the eddy current principle, in that the solenoid bodies of the plunger coils used for the force generator are manufactured from metal, for example, copper.

The metal configuration of the solenoid body also offers the possibility to cool the plunger coils effectively. This allows the force generators to be mounted directly on the guide units for the different deflection directions of the probe head because the problem of waste heat does not occur any more. On the other hand, the fact that the guide units are driven directly inside the probe head provides this probe head with high rigidity, which increases the probe head dynamics, that is, the probe pin can better follow the workpiece surface during scanning operation, even at high scanning velocities.

It is also possible to dampen the deflectable part or probe pin carrier electronically by means of a control circuit, which applies a signal to the force generators proportional to the deflection speed of the deflectable part, but opposite to the deflection direction. This type of damping requires practically no additional components, instead, it is possible to also use the force generators or plunger coils required for applying the measuring forces and the electronics anyway needed to drive them with the preselected measuring force. This is an extremely flexible solution because the damping characteristic can be adjusted by processor control, so that the damping constant is increased when the machine moves, for example, at high speed; whereas, the damping constant is reduced during the actual measuring process on the workpiece.

In the same manner, the deflectable part of the probe head can be clamped electronically in any direction because of the fact that the measuring force generators or plunger coils can also be adjusted by a microprocessor, for example, using an electrical control circuit with appropriately high gain control.

The signals required for clamping and damping can be derived from the measuring systems which are anyway provided in the probe head. These measuring systems supply the probe signal which is proportional to the displacement of the deflectable part in the particular coordinate direction so that no further sensors are required.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
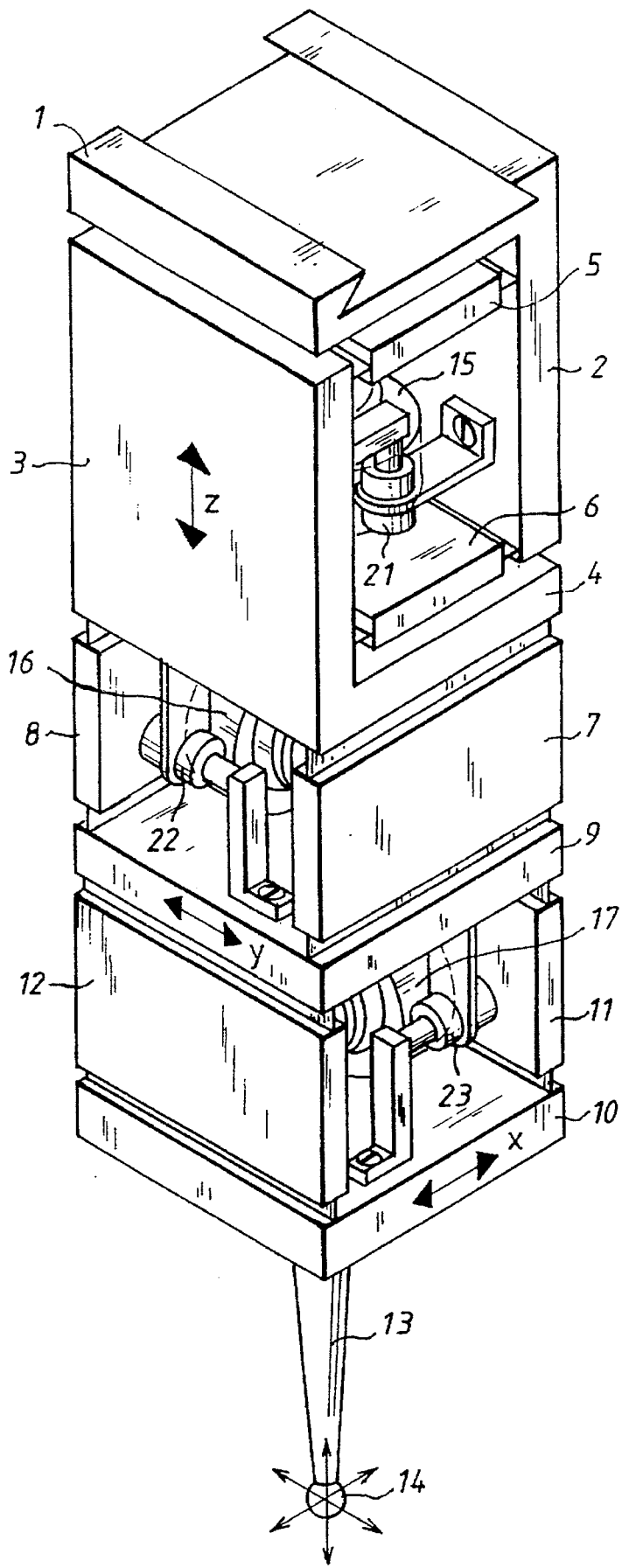
FIG. 1 is a perspective schematic showing the mechanical configuration of the probe head.

The probe head shown in FIG. 1 is equipped with a part permanently connected to the housing which has the shape of an angle and whose upper, horizontal leg 1 has a dovetail for mounting the probe head to the spindle of the coordinate measuring apparatus (not shown). The vertical leg 3 of a further L-shaped angle is connected to the vertical leg 2 of the part fixedly connected to the housing via a pair of spring steel sheets 5 and 6 reinforced in the center. The resulting parallelogram guide unit constitutes the z-guide unit of the probe head.

A plate 9 is movably suspended on the horizontal leg 4 of the angle movable in z-direction via a second pair of reinforced spring steel sheets 7 and 8. This plate 9 forms part of the y-guide unit of the probe head. On this plate, a third pair of spring steel sheets 11 and 12, rotated by 90° with respect to spring steel sheets 7 and 8, is suspended, which connects plate 9 to a further plate 10 which constitutes part of the x-guide unit of the probe head. The plate 10 carries a probe pin 13 having a probe tip 14.

Each of the three parallelogram guide units is equipped with a measuring force generator configured as a plunger coil drive. For this purpose, the first magnet 15 is mounted on the stationary leg 2, the second magnet 16 on the lower side of leg 4 and the third magnet 17 of the particular plunger coil drive on the plate 9 while the moving parts, that is, the solenoids of the plunger coil drives, are connected to the deflectable parts (3, 9, 10) of the z, y and x-guide units.

Also shown are the three measuring systems (21, 22, 23) which are used to continuously detect the deflections of the guided parts of the probe head in the three above-mentioned coordinate directions. These are so-called LVDT systems, that is, induction coils operated at a carrier frequency, which emit a displacement signal which is proportional to the position of the core displaceable within the coils.

Figure 2:
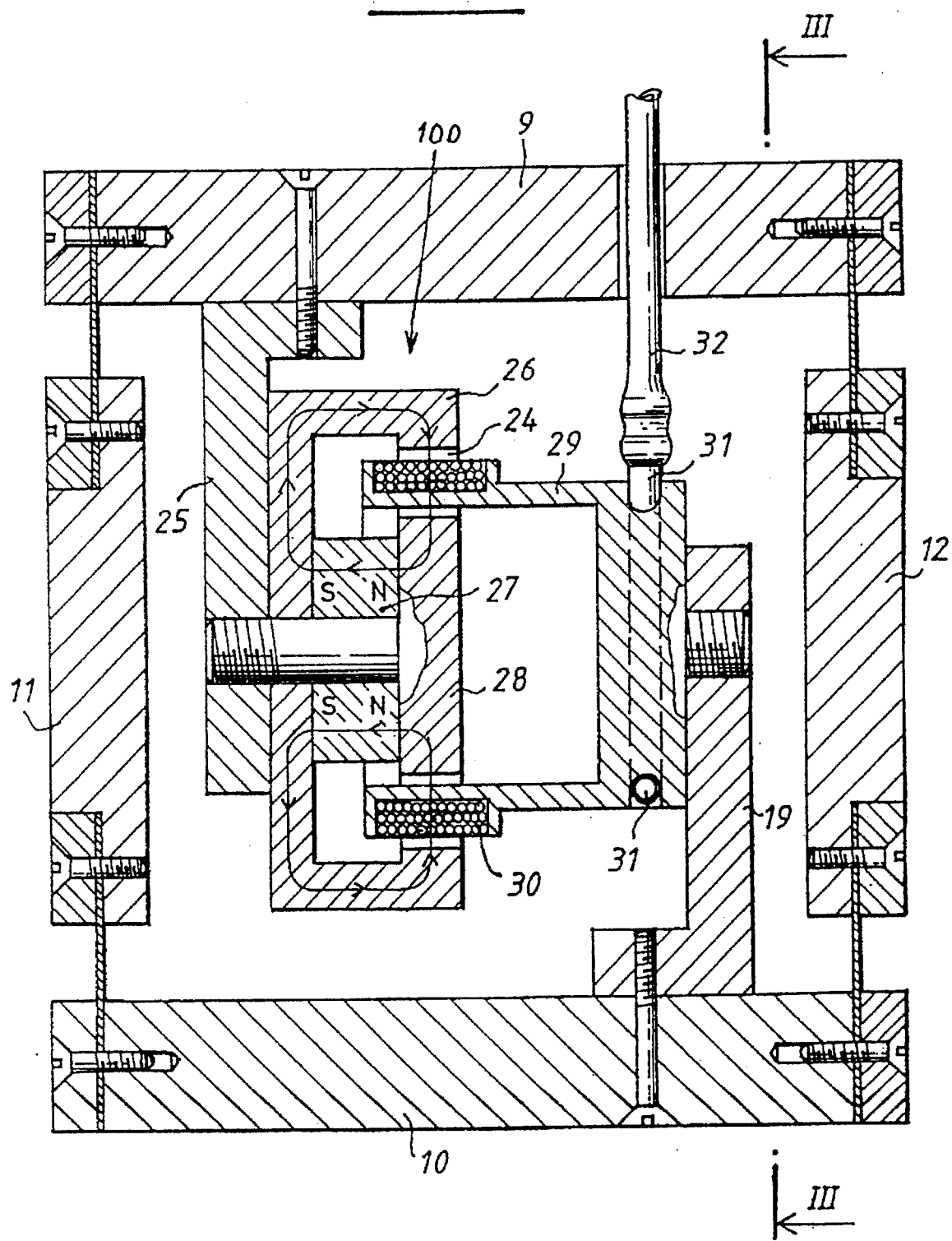
FIG. 2 shows one of the guide units of the probe head of FIG. 1 together with the corresponding force generator as a section view along the symmetry axis of the force generator.
Figure 3:
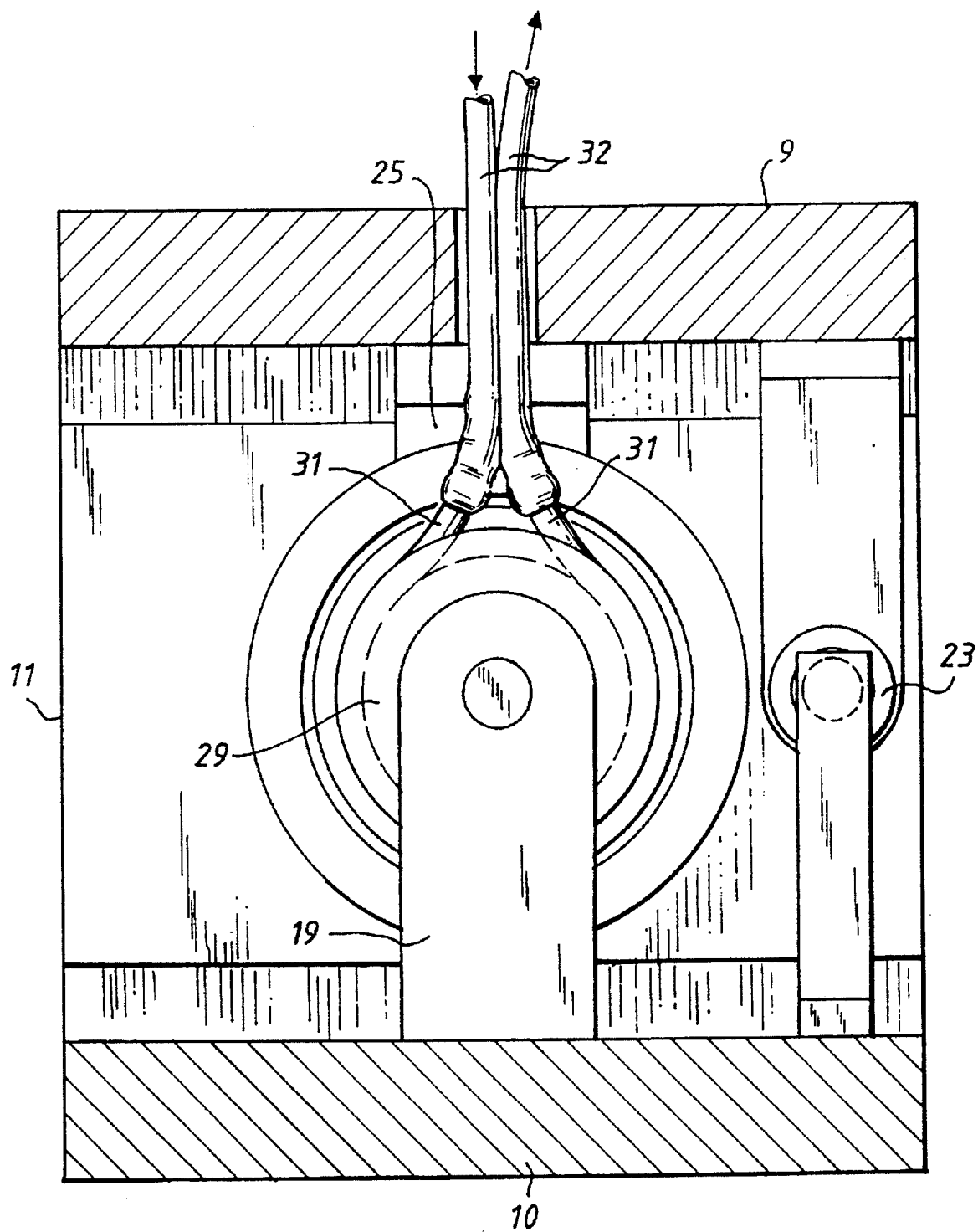
FIG. 3 is a view of the guide unit of FIG. 2 along line III—III in FIG. 2.

In FIG. 2, the x-parallelogram guide unit and the measuring force generator thereof are shown in more detail in a section view. The stationary part 100 of the measuring force generator is mounted by means of a connecting part 25 to the plate 9 and comprises a pot-shaped, soft iron component 26, into which a cylindrical or annular permanent magnet 27 with a second soft iron component 28 has been centrically inserted. In this way, an annular gap 24 is provided through which the lines of magnetic flux of the magnet 27 flow symmetrically, and into which a pot-shaped solenoid body 29 is inserted. The solenoid body 29 is connected to the deflectable plate 10 of the x-guide unit via the connecting element 19.

In the area of annular gap 24, the solenoid body 29 carries the windings 30 of the plunger coil and is made of a material having good heat-conducting and electrically-conducting characteristics such as copper. This affords two advantages: on the one hand, it permits the heat generated in the windings 30 to be dissipated in a relatively simple manner by liquid cooling using a cooling pipe 31 soldered into an annular slot of the solenoid body 29. For this purpose, the cooling pipe 31 is connected via a flexible hose 32 with a heat exchanger arranged outside of the probe head, for example, at the upper spindle end of the coordinate measuring apparatus. The hose 32 should be as flexible as possible. On the other hand, the copper solenoid body 29 acts as an eddy current brake and thereby dampens the movements of the plate 10 relative to the plate 9 of the parallelogram guide unit.

To ensure optimal heat transport, the windings 30 of the coil are embedded in the solenoid body 29 by means of a heat-conductive paste.

In the embodiment described, the three measuring force generators (15, 16, 17) are integrated directly into the three guide unit systems for the z, y and x coordinates. In addition to generating the desired measuring force, which is applied by probe tip 14 to the workpiece to be measured, the three measuring force generators (15, 16, 17) also provide for "clamping" the guide unit systems in preselectable directions, that is, in arbitrary directions which do not necessarily coincide with the guide unit directions x, y and z. Furthermore, the measuring force generators provided in the form of plunger coils can be used to apply an active damping, which is proportional to the velocity (described below). This active damping is in addition to the passive damping according to the principle of the previously-mentioned eddy current brake. The damping performance is preadjustable. All this is made possible by the microprocessor-controlled electronic control circuit described in FIGS. 4 and 5.

Figure 4:
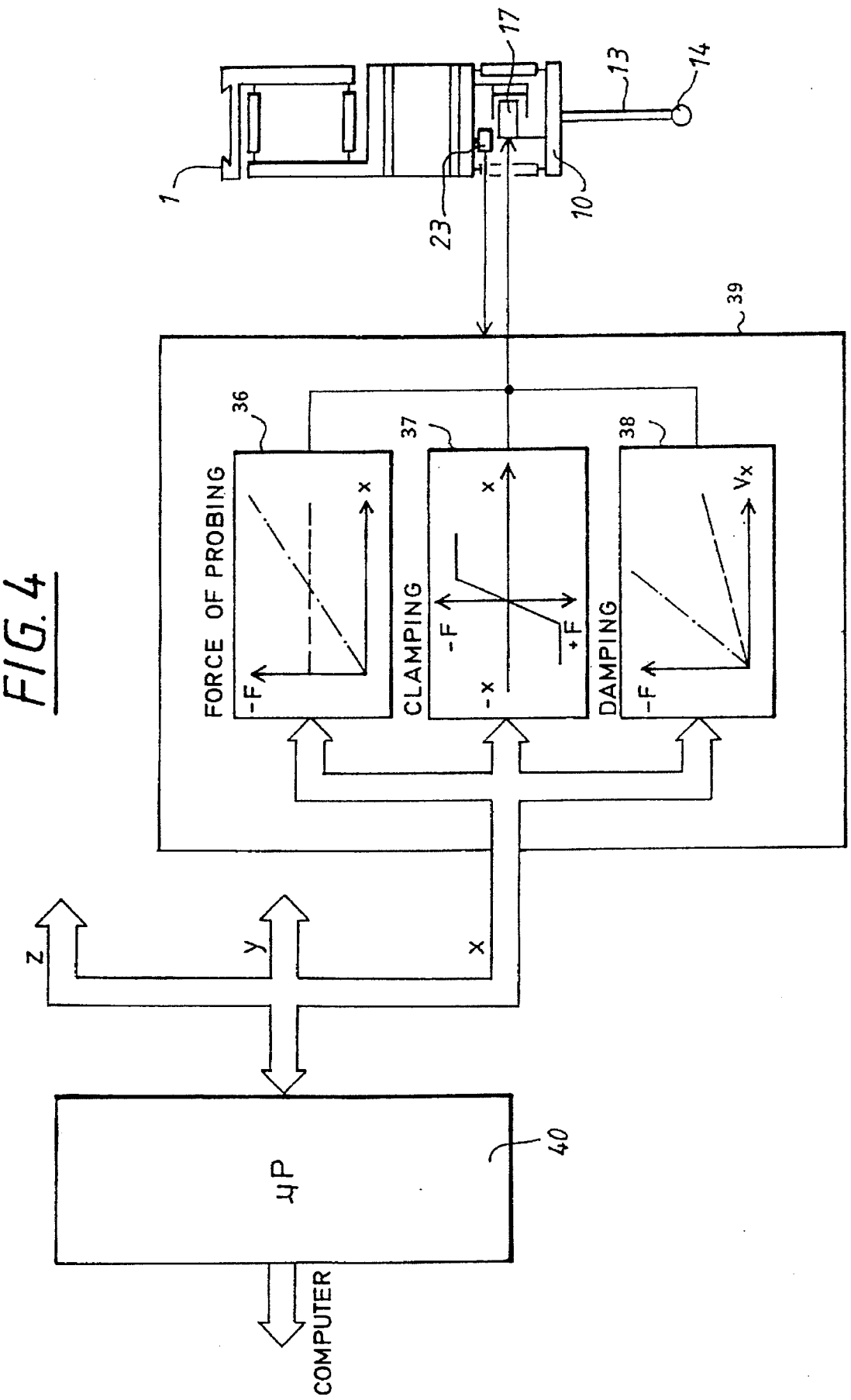
FIG. 4 is a simplified block diagram of the electronics used to control the force generators; and, FIG. 5 is a more detailed circuit diagram of the electronics of FIG. 4.
Figure 5:
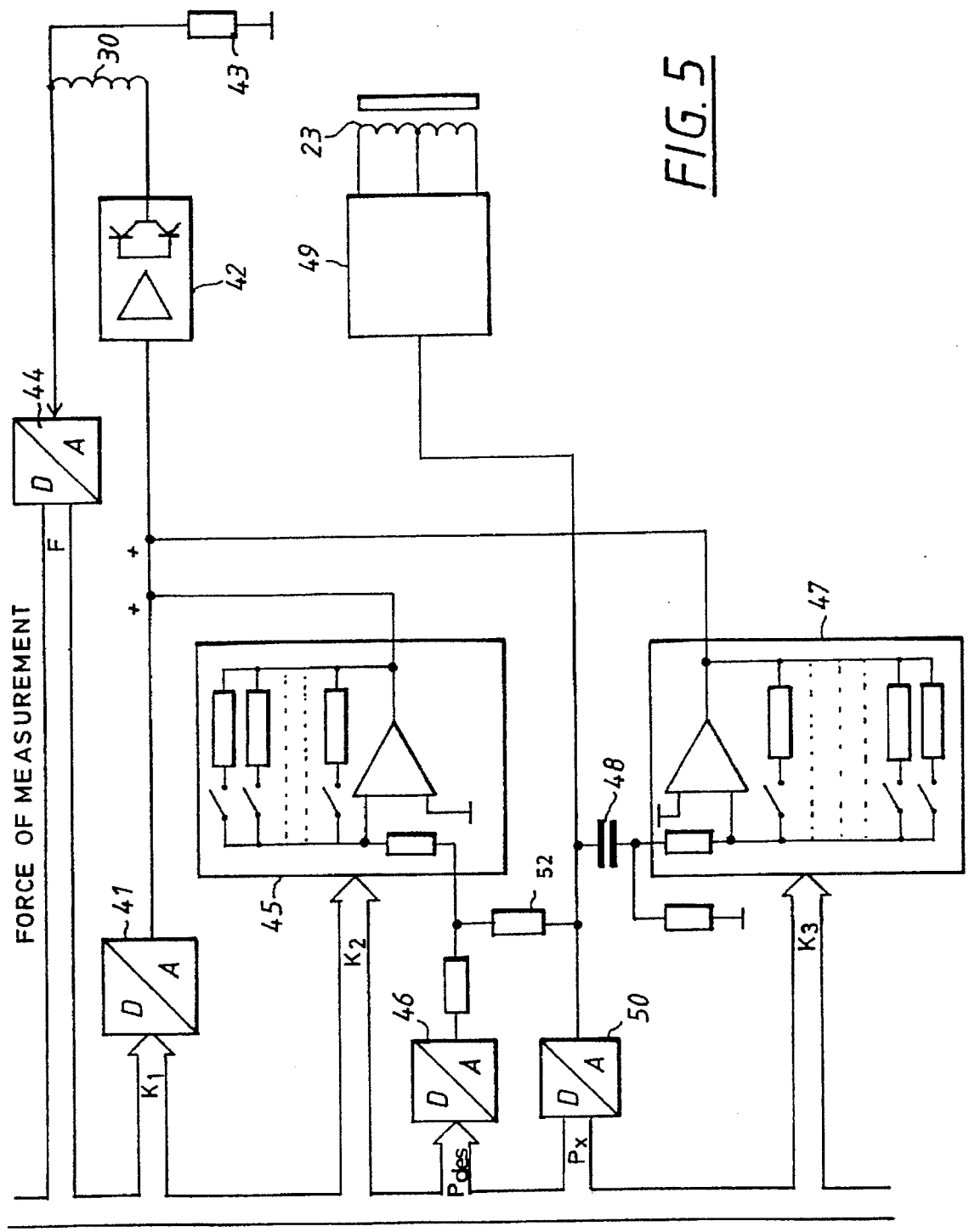

The simplified schematic of FIG. 4 shows that the system includes a microprocessor 40, which communicates via a data bus with the computer (not shown) of the coordinate measuring apparatus. The microprocessor 40, in turn, controls three more or less identical electronic circuits, of which one, the circuit 39, is shown for driving the measuring force generator 17 For the x-guide unit. At the same time, the microprocessor 40 receives a signal, which characterizes the position or instantaneous deflection of the x-guide unit, via circuit 39. This signal is the output signal of transducer 23. As shown in FIG. 5, the transducer 23, which is connected to a carrier frequency measuring amplifier 49, is connected to a data input of the microprocessor 40 via an analog-to-digital converter 50.

The circuit 39 comprises three components (36, 37, 38) which can be used to adjust the particular measuring force generated by measuring force generator 17, if required, in conjunction with the damping function, and also to adjust the clamping of the system.

Two different and alternatively applicable possibilities exist for adjusting the measuring force. Firstly, a measuring force of constant magnitude can be generated independently of the deflection of the guide unit in question. This is illustrated by the horizontal dash line in block 36 of FIG. 4. Secondly, a measuring force can be generated, which is proportional but opposite to the deflection. That is, the characteristic line of an ideal spring is simulated electronically. This is illustrated by the dot-dash line in block 36 of FIG. 4.

Electronic clamping is performed by applying a very strong measuring force acting opposite to the deflection. This corresponds to a spring characteristic line having an extremely steep slope with this characteristic line being limited when the current flowing through the winding 30 of the measuring force generator 17 reaches its maximum.

The damping characteristic is generated by applying a counter force proportional to the deflection velocity of the guide unit, with the magnitude of damping being adjusted via the proportionality factor.

The control performance of the circuit 39 thus follows essentially the following mathematical function:

$$F_x = K1 - K2 \cdot P_x - K3 \cdot dP_x/dt \qquad (1)$$

wherein: K1 defines the magnitude of the constant, deflection-independent measuring force; K2 defines the proportionality constant of the counter force proportional to deflection during clamping or measuring force generation by simulating a spring characteristic line; and, K3 defines the damping magnitude proportional to velocity.

The control circuit shown in FIG. 5 drives the measuring force generator in accordance with equation (1). There, the constants K1, K2 and K3 are supplied in the form of digital data via appropriate data lines or via digital outputs of the microprocessor 40. The constant K1, which describes the magnitude of the deflection-independent measuring force, is converted into an analog signal by a digital-to-analog converter 41 and is supplied to power amplifier 42. The output of the amplifier 42 is connected to the windings 30 of the solenoid body 29 of measuring force generator 17. Since an appropriate circuit is provided for all three measuring force generators (15, 16, 17), the direction of the measuring force can be systematically preselected by an appropriate vector drive. The voltage drop across the precision resistor 43 in the electric circuit of the windings 30 of the measuring force generator 17 is supplied to an analog-to-digital converter 44 and reaches a data input of the microprocessor 40 as digital information. Information on the actual measuring force applied can thus be further processed by the microprocessor 40 or the computer of the coordinate measuring apparatus, for example, to correct the force-dependent bending of probe pin 13 or other resilient components of the coordinate measuring apparatus.

The position measuring signal $P_x$ is supplied by the carrier frequency measuring amplifier 49 and the velocity-dependent damping is adjusted by feeding this signal to a programmable amplifier 47 via a high-pass filter 48. The amplification factor of this amplifier 47 can be set according to the constant K3. This permits the slope of control characteristic $F(v_x)$ to be adjusted. The output of the programmable amplifier 47 is also applied to the input of current amplifier 42 for the measuring force generator 17.

A second programmable amplifier 45 is provided for adjusting the clamping force and clamping direction. The magnitude of clamping, that is, the slope of the characteristic of the controller is defined by the constant K2 which sets the amplification factor of the programmable amplifier 45. Since, in addition, the direction of the clamping force is to be defined as a vector, an appropriately calculated digital signal $P_{des}$, which is provided by a digital output of the microprocessor 40, is converted into an analog signal by a digital-to-analog converter 46 and fed to the input of the programmable amplifier 45. The output of the amplifier 45 is connected to the input of the current amplifier 42. At the same time, the output of the carrier frequency measuring amplifier 49 is connected to the input of the programmable amplifier 45, which therefore receives a signal opposite to the deflection of the probe pin 13, this signal being greatly amplified by the amplifier 45.

From the data on the particular actual value $P_x$ of the deflection received from the analog-to-digital converter 50, the microprocessor 40 calculates the input value $P_{des}$ for amplifier 45 for adjusting the direction of the counter force. This process takes place as follows: if the probe pin 13 is to be clamped in the x-direction, $P_{des}$ is set to zero and each attempted displacement out of this zero point generates a very high deflection-dependent counter force via the analog control loop including the resistor 52. If, on the other hand, the x-axis is to be released (unclamped), $P_{des}$ is set continuously to the value of $-P_x$. The values of $P_{des}$ and $P_x$ summed up at the input of the amplifier 45 then compensate for each other so that the x-guide unit can be deflected without amplifier 45 "counteracting". The rotation of the clamping force in the x/y plane, for example, is produced by setting the $P_{des}$ values for the x-direction and y-direction to the appropriate ratio so that the normal $\vec{N_K}$ corresponds to direction vector $\vec{E_K}$ of the clamping force. In this case, the following holds:

$$\vec{P_{des}} = \sqrt{P_x^2 + P_y^2} \cdot \vec{N_K} \text{ and } \vec{N_K} \perp \vec{E_K} \qquad (2)$$

In the above-mentioned embodiment, the measuring force generators (15 to 17) are configured as plunger coil systems. It is, however, also possible to replace the plunger coils with other electromagnetic drives, such as linear motors.

It is understood that the foregoing description is that of the preferred embodiments of the invention and that various changes and modifications may be made thereto without departing from the spirit and scope of the invention as defined in the appended claims.

What is claimed is:

1. A probe head for a coordinate measuring apparatus, the probe head comprising:

a displaceable part;

three measuring systems for measuring the deflections of said displaceable part in three different directions;

a guide system for holding said displaceable part so as to permit said displaceable part to deflect in said different directions;

the guide system including: a first guide unit for permitting said part to deflect in a first one of said directions; a second guide unit for permitting said part to deflect in a second one of said directions; and, a third guide unit for permitting said part to deflect in a third one of said directions;

each one of said guide units including a measuring sensor for measuring the deflection in said one direction corresponding thereto;

each one of said guide units further including: an electromagnetic force generator for generating a measuring force of predeterminable magnitude and direction;

a clamping device for clamping said displaceable part in said predeterminable direction;

said clamping device including a control circuit for applying a signal to said electromagnetic force generators opposite in direction to the deflection of said displaceable part; and, an electromagnetic damping device for said displaceable part.

2. The probe head of claim 1, said electromagnetic damping device including structure to permit said damping device to operate as an eddy current brake.

3. The probe head of claims 2, each of said electromagnetic force generators being a plunger coil having a solenoid body made of metal.

4. The probe head of claim 3, further comprising a cooling device for removing heat away from said the plunger coil.

5. The probe head of claim 4, said cooling device including tubes for conducting a coolant liquid therethrough and said tubes being connected to said solenoid body.

6. The probe head of claim 5, said electromagnetic damping device including an electronic control circuit for applying a signal to said electromagnetic force generators; and, said signal being proportional to the velocity with which said displaceable part deflects and opposite to the direction in which said displaceable part is deflected.

7. The probe head of claim 6, said electromagnetic damping device having a damping characteristic; and, said probe head further comprising a control processor for controlling the adjusting of said damping characteristic.

8. The probe head of claim 1, said control circuit of said clamping device having a control gain; and, said probe head further including a control processor for adjusting said control gain.

9. The probe head of claim 1, wherein the coordinate measuring apparatus includes a control computer, the probe head further comprising a microprocessor for inputting measuring forces to each of said directions for adjusting the clamping forces in said predeterminable directions and for generating a velocity-dependent damping; drive circuits connected to corresponding ones of said electromagnetic force generators; said microprocessor having outputs connected to said drive circuits; and, a data bus for connecting said microprocessor to said control computer.

10. The probe head of claim 1, wherein: control signals for adjusting the measuring forces and the clamping forces and the damping are derived from said measuring systems; and, each of said measuring systems is adapted to supply a probe signal proportional to the deflection of said displaceable part in the particular direction.

* * * * *